(12) United States Patent
Lou et al.

(10) Patent No.: US 10,783,614 B2
(45) Date of Patent: Sep. 22, 2020

(54) DENOISING CT IMAGE

(71) Applicant: Beijing Neusoft Medical Equipment Co., Ltd., Beijing (CN)

(72) Inventors: Shanshan Lou, Shenyang (CN); Hao Chen, Shenyang (CN); Ling Pang, Shenyang (CN)

(73) Assignee: Beijing Neusoft Medical Equipment Co., Ltd., Beijing (CN)

( * ) Notice: Subject to any disclaimer, the term of this patent is extended or adjusted under 35 U.S.C. 154(b) by 52 days.

(21) Appl. No.: 16/171,313

(22) Filed: Oct. 25, 2018

(65) Prior Publication Data

US 2019/0122343 A1 Apr. 25, 2019

(30) Foreign Application Priority Data

Oct. 25, 2017 (CN) .......................... 2017 1 1007187

(51) Int. Cl.
| | |
|---|---|
| *G06T 5/20* | (2006.01) |
| *G06T 5/00* | (2006.01) |
| *G06T 3/40* | (2006.01) |
| *G06T 5/50* | (2006.01) |
| *G06T 11/00* | (2006.01) |

(52) U.S. Cl.
CPC ............ *G06T 5/002* (2013.01); *G06T 3/4007* (2013.01); *G06T 5/20* (2013.01); *G06T 5/50* (2013.01); *G06T 11/008* (2013.01); *G06T 2207/10072* (2013.01); *G06T 2207/10081* (2013.01); *G06T 2207/20221* (2013.01)

(58) Field of Classification Search
CPC .................................. G06T 5/002; G06T 5/20
See application file for complete search history.

(56) References Cited

U.S. PATENT DOCUMENTS

2006/0262994 A1* 11/2006 Patera .................. G06T 3/4084
382/276
2017/0084058 A1* 3/2017 Kim ...................... G06T 11/006

FOREIGN PATENT DOCUMENTS

| CN | 101634748 A | 1/2010 |
| CN | 102136138 A | 7/2011 |
| CN | 103049886 A | 4/2013 |
| CN | 103106676 A | 5/2013 |

(Continued)

OTHER PUBLICATIONS

State Intellectual Property Office of the People's Republic of China, Office Action and Search Report Issued in Application No. 201711007187.8, dated Jul. 2, 2019, 15 pages,(Submitted with Machine Translation).

(Continued)

*Primary Examiner* — Tuan H Nguyen
(74) *Attorney, Agent, or Firm* — Kilpatrick Townsend & Stockton, LLP

(57) ABSTRACT

Methods, devices and a machine-readable storage medium for denoising a Computed Tomography (CT) image are provided. In one aspect, a method of denoising a CT image includes: generating an original CT image according to raw data which is obtained by scanning a subject, where a pixel count of the original CT image is greater than a preset target pixel count; obtaining a denoised image by denoising the original CT image; and obtaining a target image as a CT image of the subject by compressing the denoised image to the preset target pixel count based on an interpolation algorithm.

13 Claims, 3 Drawing Sheets

(56) References Cited

FOREIGN PATENT DOCUMENTS

| | | |
|---|---|---|
| CN | 103366389 A | 10/2013 |
| CN | 104951782 A | 9/2015 |

OTHER PUBLICATIONS

Lin Li, "The 3 D Reconstruction of Liver Vascular Skeletons" Journal of Langfang Teachers University (Natural Science Edition), vol. 16, No. 2, Jun. 30, 2016.

* cited by examiner

DENOISING CT IMAGE

CROSS REFERENCE TO RELATED APPLICATIONS

This application claims priority to Chinese Patent Application No. 201711007187.8 filed on Oct. 25, 2017, the entire content of which is incorporated herein by reference.

BACKGROUND

In recent years, in Computed Tomography (CT) technology, X-ray radiation dose may often be reduced by lowering a tube current or a tube voltage of an X-ray tube. However, lowering the tube current or the tube voltage of the X-ray tube may increase blocky and granular noises of a CT image and reduce image quality, thereby affecting diagnosis. Therefore, it is necessary to denoise the CT image.

At present, a denoised CT image may usually be obtained by denoising a CT image based on a principal component analysis algorithm.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

DETAILED DESCRIPTION

Figure 1:
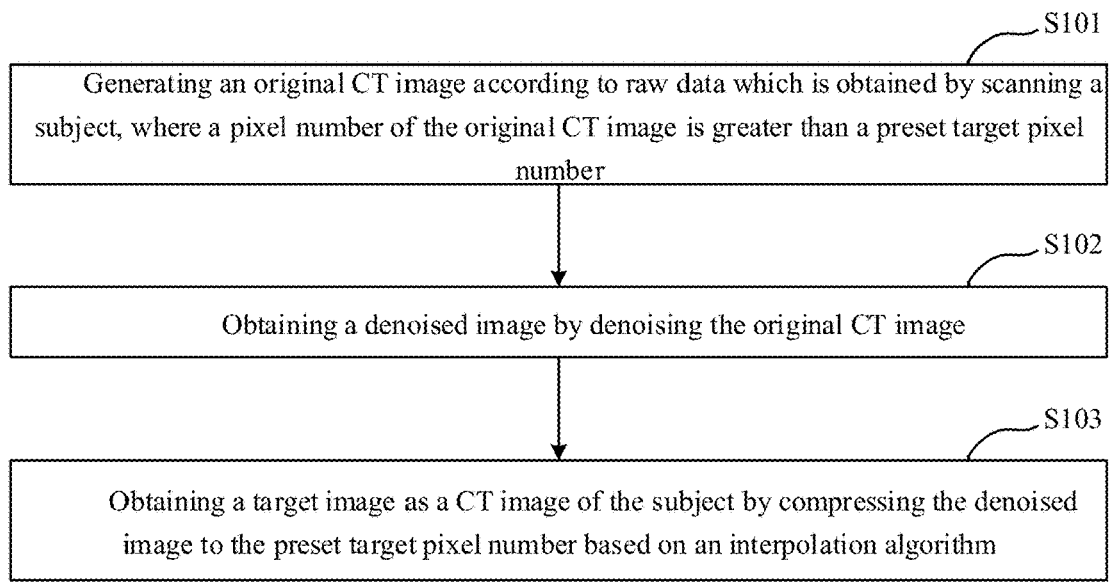
FIG. 1 is a flowchart illustrating a process of denoising a CT image according to a first example of the present disclosure.

Examples will be described in details and illustrated in the drawings. When the following descriptions involve the drawings, like numerals in different drawings represent like or similar elements unless stated otherwise. The implementations described in the following examples do not represent all implementations consistent with the present disclosure. On the contrary, they are examples of a device and a method consistent with some aspects of the present disclosure described in detail in the appended claims.

The terminology used in the present disclosure is for the purpose of describing a particular example only, and is not intended to be limiting of the present disclosure. The singular forms such as "a", "said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, the information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

In an example, a CT image may be denoised by adopting a principal component analysis algorithm. However, when the CT image is denoised by adopting the principal component analysis algorithm, problems of excessive smoothness of the denoised CT image and loss of part of fine tissues of the denoised CT image may be caused very easily.

The present disclosure provides a method of denoising a CT image to solve the problems of excessive smoothness and loss of part of fine tissues of the denoised CT image obtained by an existing denoising method.

Technical solutions of the present disclosure will be described below with reference to specific examples. The following specific examples may be combined with each other. Same or similar concepts or processes may be only described in some examples.

FIG. 1 illustrates a process of denoising a CT image according to an example of the present disclosure. As shown in FIG. 1, the method provided by the example may include the following steps.

Step S101: an original CT image is generated according to raw data which is obtained by scanning a subject, where a pixel count of the original CT image is greater than a preset target pixel count.

The preset target pixel count may be preset by medical staff according to an actual clinical need which is achieved by setting an image reconstruction matrix. The image reconstruction matrix is set in an image reconstruction machine in a CT system. For example, the image reconstruction matrix may be 768*768. Thus the preset target pixel count is 768*768=589824. It is to be noted that when the image reconstruction matrix is 768*768, a CT image contains 768*768 pixels after image reconstruction is performed by adopting the image reconstruction matrix. The pixel count will be represented below in a matrix form. For another example, the preset target pixel count may also be 256*256. Descriptions are made below with the preset target pixel count being 768*768. Further, in this step, to generate a required original CT image, the image reconstruction matrix may be modified according to a first pixel count, and then, an original CT image with the first pixel count may be generated by performing image reconstruction based on raw data and the modified image reconstruction matrix. The first pixel count is greater than the preset pixel count, and the first pixel count may be set according to an empirical value. For example, the first pixel count may be 2048*2048. For another example, the first pixel count may also be 1024*1024. A specific value of the first pixel count is not limited in the present disclosure. Descriptions are made below with the first pixel count being 2048*2048. In this example, the image reconstruction matrix may be modified from 768*768 to 2048*2048 according to the first pixel count, and then, image reconstruction may be performed according to raw data and the modified image reconstruction matrix. In this way, the original CT image with the pixel count being 2048*2048 may be obtained.

It is to be noted that a larger pixel count of an original CT image indicates higher resolution of the original CT image. When the original CT image with high resolution is denoised, there may be more resolution redundancy, which makes it easier to preserve fine tissues. In addition, when the original CT image with high resolution is denoised, an adjustment range of a denoising parameter may be larger, thereby realizing finer adjustment, reducing adjusting difficulty of the denoising parameter, and achieving a better denoising effect.

Step S102: a denoised image is obtained by denoising the original CT image.

In an example, the original CT image with high resolution may be denoised by using a denoising algorithm, for example, a principal component analysis algorithm. The principal component analysis is an orthogonal linear transformation for acquiring mutually uncorrelated feature vectors. Through the principal component analysis, a feature space favourable for classification may be constructed by reducing dimensionality of a CT image, extracting an algebraic feature of the CT image and performing feature selection. The principal component analysis algorithm is a common algorithm, which will not be described herein. With the improved resolution of the original CT image, the problem of excessive smoothness brought by the principal component analysis algorithm may be alleviated and more partial fine tissues may be retained.

Figure 2:
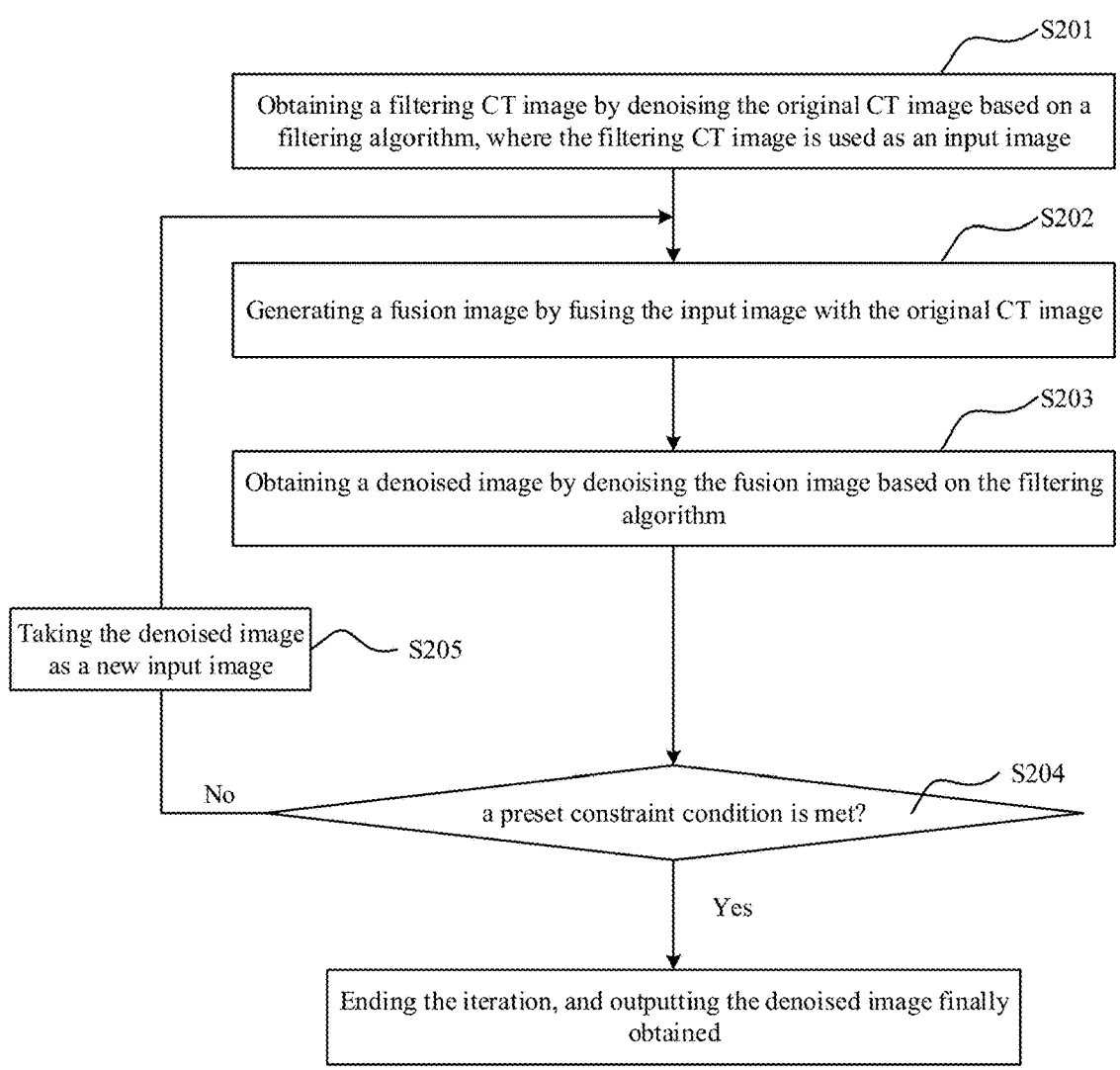
FIG. 2 is a flowchart illustrating a process of performing iterative denoising for an original CT image according to an example of the present disclosure.

Since medical CT images have high requirements for image quality, it may be difficult to achieve an expected result by a single denoising process. Therefore, in another example, iterative denoising may also be performed. FIG. 2 is a flowchart illustrating a process of performing iterative denoising for an original CT image according to the example. As shown in FIG. 2, a method of performing iterative denoising for the original CT image may include the following steps:

Step S201: a filtering CT image is obtained by denoising the original CT image based on a filtering algorithm, and then the filtering CT image is used as an input image.

When the original CT image is denoised by adopting a filtering algorithm, the filtering CT image may be obtained by setting an appropriate filtering parameter. In the example, the filtering parameter may represent the denoising parameter. The method of setting a filtering parameter may be referred to descriptions in the prior art, which will not be described herein. Further, in this step, the original CT image may be denoised by adopting a filtering algorithm such as a median filtering algorithm, a non-local means filtering algorithm, or a principal component analysis algorithm. Below we take the non-local means filtering algorithm as an example.

A principle of the non-local means filtering algorithm is briefly introduced below. In the non-local means filtering algorithm, a filtered grayscale value of a pixel i may be computed as a weighted average grayscale values of all pixels in an image. A weighting factor of a pixel j is determined by similarity between the pixel i and the pixel j, where pixel j is one pixel in the image. In theory, the algorithm uses the grayscale values of all pixels in the image to calculate the filtered grayscale value of the pixel i. However, considering the efficiency problem, a search field is set. The pixel i is located at the midpoint of the search field, and only the grayscale values of pixels in the search field are used to calculate the filtered grayscale value of the pixel i.

For example, for a pixel i in the original image y, a filtered grayscale value of the pixel i may be calculated by the following formula (1). The original image y may also be a noisy image.

$$\hat{A}(i) = \frac{\sum_{j \in \Omega} w(i, j) y(j)}{\sum_{j \in \Omega} w(i, j)}, \quad (1)$$

where $\Omega$ refers to a search field,
y(j) refers to a grayscale value of a pixel j in the original image y,
w(i, j) refers to a weighting factor of the pixel j corresponding to the pixel i,
$\hat{A}(i)$ refers to a filtered grayscale value of the pixel i, and
$\hat{A}$ refers to a filtering image wanted.

In addition, w(i, j) may be calculated by the following formula (2).

$$w(i, j) = e^{-\frac{1}{2}\left(\frac{(g(i)-g(j))^2 + 3(\mu_{Ni} - \mu_{Nj})^2}{2h_f^2}\right)}, \quad (2)$$

where g refers to a guide image, and the guide image g is an image obtained by denoising the original image y, for example, the guide image g may be an image obtained by denoising the original image y based on an LPG-PCA (Local Pixel Grouping-Principle Component Analysis) algorithm,
g(i) and g(j) refer to grayscale values of the pixel i and the pixel j in the guide image g respectively,
$\mu_{Ni}$ and $\mu_{Nj}$ refer to mean values of the grayscale values of the pixels in image blocks $N_i$ and $N_j$ surrounding the pixel i and the pixel j in the guide image g respectively, and
h refers to a filtering parameter related to a noise standard deviation of the original image y, and may be represented as h=k×σ, where σ refers to a noise standard deviation of the original image y, and k refers to a constant.

Step S202: a fusion image is generated by fusing the input image with the original CT image.

A fusion image may be obtained by fusing the input image with the original CT image based on an image fusion technology. The input image is a filtering image with a low noise level. For example, wavelet decomposition may be performed for the input image and the original CT image respectively, and weighted stacking may be then performed for the decomposed input images and decomposed original CT images in a wavelet domain. In this way, fusion of the input image and the original CT image can be realized. The technique of image fusion in the wavelet domain is a common image fusion method, which will not be described herein. This disclosure does not limit the method of image fusion. It is to be noted that, in this step, the fusion image obtained by fusing the input image and the original CT image may retain fine tissues and have a noise level between the input image and the original CT image.

Step S203: a denoised image is obtained by denoising the fusion image based on above filtering algorithm.

In this step, the denoised image may be obtained by denoising the fusion image based on the filtering algorithm to remove a part of noises. It is to be noted that the noise level of the denoised image is lower than that of the fusion image. Meanwhile, the denoised image retains fine tissues.

Step S204: Determine whether a preset constraint condition is met. If yes, the process ends, and the denoised image finally obtained is used as the final denoised image. If not, step S205 is performed.

The preset constraint condition may be that quality of the denoised image reaches a preset value, or a number of times of updating the denoised image reaches a preset threshold. The quality of the denoised image reaching the preset value may be that signal to noise ratio of the denoised image is larger than the preset value. The preset threshold related to the number of times of updating may be set empirically. For example, the preset threshold may be 5 or 4. The preset constraint condition is not limited in this disclosure. For simplicity, descriptions will be made below with the preset constraint condition that the preset threshold is two. When the input image in step S202 is the filtering CT image obtained in step S201, the number of times of updating is one. In this step, it is determined that the number of times of updating does not reach the preset threshold, and step S205 is performed.

Step S205: the denoised image is taken as a new input image, and then the process will go to step S202.

When the preset constraint condition is not satisfied, the denoised image may be taken as a new input image. Step S202 and the following steps are performed again. In this way, an updated denoised image may be obtained at step S203. It is to be noted that when step S204 is performed again, the number of times of updating is 2 which meets the preset constraint condition. The updated denoised image may be output as the final denoised image.

The final denoised image obtained by the iteration method may better retain fine tissues of the original CT image and lower the noise level at the same time, thereby satisfying the quality requirement of a CT image.

Step S103: a target image is obtained as a CT image of the subject by compressing the denoised image to the preset target pixel count based on an interpolation algorithm.

The pixel count of the denoised image obtained at step S102 is same as the pixel count of the original CT image, and is greater than the preset target pixel count. In this step, the target image may be obtained by compressing the denoised image to the target pixel count based on an existing interpolation algorithm. In one example, the pixel count of the denoised image may be compressed to the target pixel count by adopting Lanczos interpolation algorithm. As mentioned in step S101, the pixel count of the original CT image is 2048*2048, which means the pixel count of the denoised image is also 2048*2048, and the preset target pixel count is 768*768. In this step, the denoised image with the pixel count being 2048*2048 may be compressed to the target image with the pixel count being 768*768 by adopting the Lanczos interpolation algorithm.

Figures 3A, 3B:
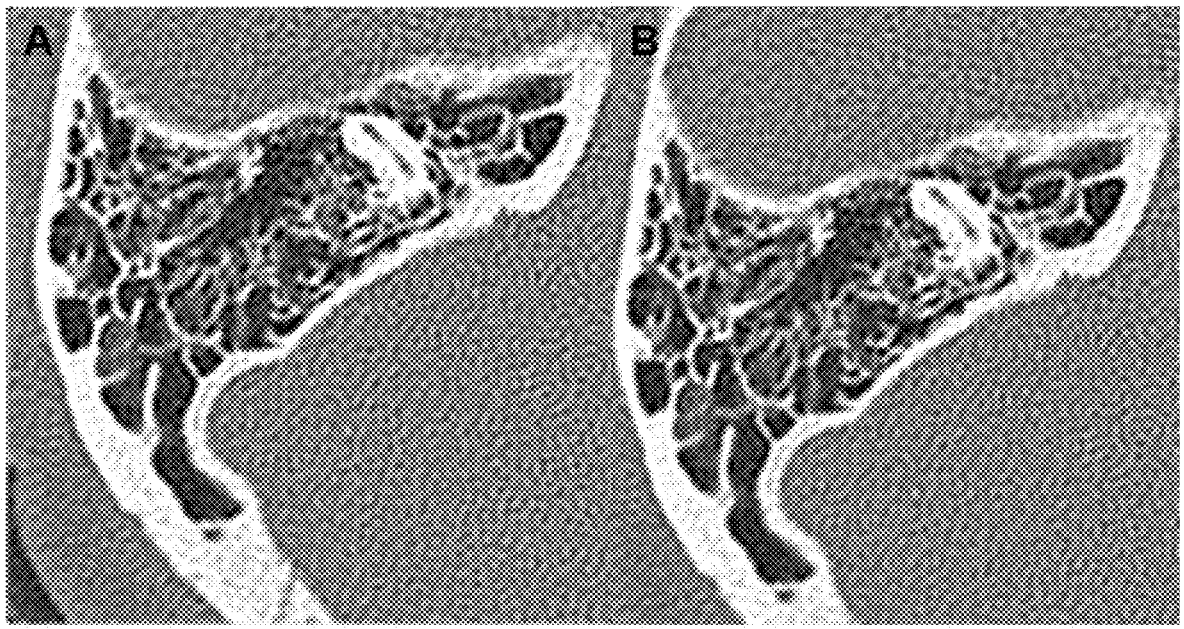
FIG. 3A illustrates part of an image with a pixel count being 2048*2048 according to an example of the present disclosure.
FIG. 3B illustrates part of an image with a pixel count being 768*768 obtained by performing a Lanczos interpolation algorithm for FIG. 3A.

FIG. 3A illustrates part of an image with a pixel count being 2048*2048 according to an example of the present disclosure. FIG. 3B illustrates part of an image with a pixel count being 768*768 obtained by performing a Lanczos interpolation algorithm for FIG. 3A. As can be seen from FIG. 3A and FIG. 3B, fine tissues may still be retained as much as possible after compressing the high resolution image to the low resolution image based on the Lanczos interpolation algorithm.

Figures 4A, 4B:
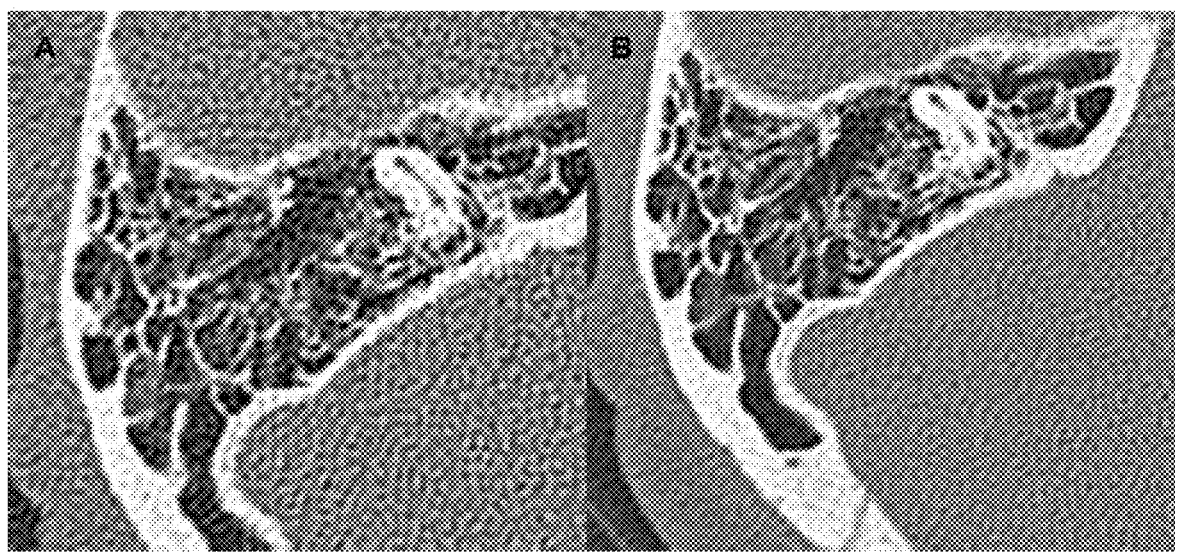
FIG. 4A illustrates part of a CT image obtained without adopting a method provided by the present disclosure.
FIG. 4B illustrates part of a target image obtained by using CT raw data used for generating FIG. 4A according to a denoising method provided by the present disclosure.

FIG. 4A illustrates part of a CT image obtained without adopting a method provided by the present disclosure. FIG. 4B illustrates part of a target image obtained by using CT raw data used for generating FIG. 4A according to a denoising method provided by the present disclosure. As can be seen from FIG. 4A and FIG. 4B, the target image obtained by performing denoising method provided by the present disclosure has a relatively low noise level and retains fine tissues better.

In the methods of denoising a CT image provided by the disclosure, an original CT image with a pixel count greater than a preset target pixel count may be generated according to raw data obtained by scanning a subject. Then, a denoised image may be obtained by denoising the original CT image. Finally, a target image may be obtained as a CT image of the subject by compressing the denoised image to the preset target pixel count based on an interpolation algorithm. Since an image denoised during the denoising process is the original CT image with a large pixel count, details can be retained better. In addition, in an example, an iterative denoising method is used during the denoising process. With the iterative denoising method, the problem of loss of fine tissues can be better solved. Therefore, according to the methods provided in the present disclosure, an image effect of reducing a noise level and retaining fine tissues may be achieved. In addition, when the original CT image with a large pixel count is denoised, an adjustable range of a denoising parameter may be larger, thereby realizing finer parameter adjustment.

Corresponding to the methods of denoising a CT image provided by the above examples, the present disclosure also provides an example of a device for denoising a CT image.

Figure 5:
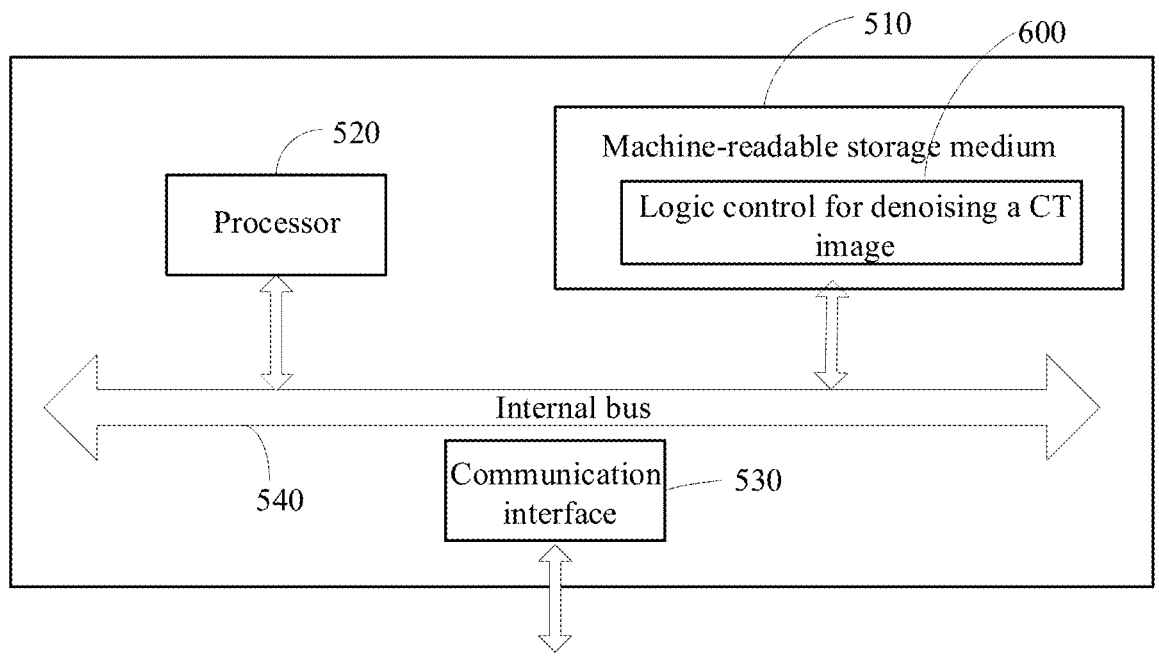
FIG. 5 is a schematic diagram illustrating a hardware structure of a device for denoising a CT image according to an example of the present disclosure.

FIG. 5 is a schematic diagram illustrating a hardware structure of a device for denoising a CT image according to an example of the present disclosure. The device may include a machine-readable storage medium 510 and a processor 520, where the processor 520 and the machine-readable storage medium 510 are usually connected with each other via an internal bus 540. In other possible implementations, the device may also include a communication interface 530 for communicating with other devices or components.

Figure 6:
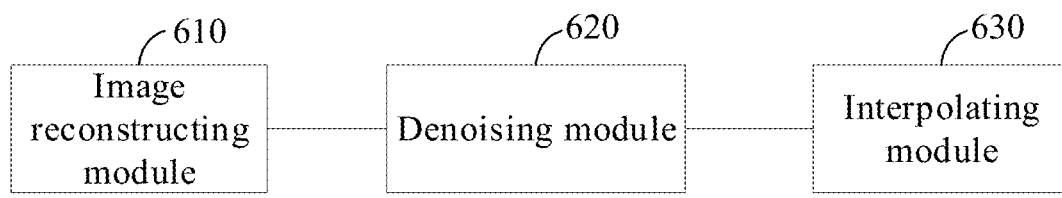
FIG. 6 is a schematic diagram illustrating functional modules of control logic for denoising a CT image according to a first example of the present disclosure.

Further, the machine-readable storage medium 510 may store control logic 600 for denoising a CT image. As shown in FIG. 6, functionally, the control logic may include an image reconstructing module 610, a denoising module 620 and an interpolating module 630.

The image reconstructing module 610 is configured to generate an original CT image according to raw data obtained by scanning a subject, where a pixel count of the original CT image is greater than a preset target pixel count.

The denoising module 620 is configured to obtain a denoised image by denoising the original CT image.

The interpolating module 630 is configured to obtain a target image as a CT image of the subject by compressing the denoised image to the preset target pixel count based on an interpolation algorithm.

An image effect of reducing a noise level and retaining fine tissues may be achieved by adopting the device provided by the present disclosure. In addition, when the original CT image with a large pixel count is denoised, an adjustable range of a denoising parameter may be larger, thereby realizing finer parameter adjustment.

A software implementation is taken as an example below to further describe how a device for denoising a CT image executes the control logic 600. In this example, the control logic 600 of the present disclosure shall be understood as the computer instructions stored in the machine-readable storage medium 510. When the processor 520 on the device for denoising a CT image in the present disclosure executes the control logic 600, the processor 520 may perform the following operations by invoking the instructions corresponding to the control logic 600 stored on the machine-readable storage medium 510.

An original CT image is generated according to raw data obtained by scanning a subject, where a pixel count of the original CT image is greater than a preset target pixel count.

A denoised image is obtained by denoising the original CT image.

A target image is obtained as a CT image of the subject by compressing the denoised image to the preset target pixel count based on an interpolation algorithm.

In one example, when the processor denoises the original CT image, the followings may be specifically included.

A filtering CT image is obtained by denoising the original CT image based on a filtering algorithm.

A fusion image is generated from the original CT image by taking the filtering CT image as an input image to be fused with the original CT image.

A denoised image is obtained by denoising the fusion image based on the filtering algorithm.

When a preset constraint condition is not met, updating the denoised image by taking the denoised image as a new input image to be fused with the original CT image until the preset constraint condition is met.

Further, the filtering algorithm is a non-local means filtering algorithm.

Further, the preset constraint condition includes any one of the followings.

The quality of the denoised image reaches a preset value.

A number of times of updating the denoised image reaches a preset threshold.

In another example, when the processor denoises the original CT image, the followings may be specifically included.

The denoised image is obtained by performing a principal component analysis for the original CT image.

When the processor generates the original CT image according to the raw data, the followings may be specifically included.

An image reconstruction matrix is modified according to a first pixel count, wherein the first pixel count is greater than the preset target pixel count.

The original CT image is generated by performing image reconstruction based on the raw data and the modified image reconstruction matrix.

Further, the interpolation algorithm may be a Lanczos interpolation algorithm.

Further, the present disclosure also provides a computer-readable storage medium storing a computer program. When the program is executed by one or more processors, the one or more processors are caused to perform a method of denoising a CT image. The method of denoising the CT image includes:

an original CT image is generated according to raw data obtained by scanning a subject, where a pixel count of the original CT image is greater than a preset target pixel count;

a denoised image is obtained by denoising the original CT image; and a target image is obtained as a CT image of the subject by compressing the denoised image to the preset target pixel count based on an interpolation algorithm.

Specifically, the computer-readable storage medium suitable for storing computer program instructions and data may include all forms of non-volatile memories, media and memory devices, such as a semiconductor memory device (e.g., an Erasable Programmable Read-Only Memory (EPROM), an Electrically Erasable Programmable Read-Only Memory (EEPROM), and a flash memory), a magnetic disk (e.g., an internal hard disk or a removable disk), a magneto-optical disk, a Compact Disk Read-Only Memory (CD ROM) and a Digital Video Disk Read-Only Memory (DVD-ROM). The processor and the memory may be supplemented by or incorporated in a dedicated logical circuit.

Finally, it is to be noted that the above examples are merely illustrative of the technical solutions of the present disclosure, but not intended to limit the present disclosure; although the present disclosure is described in detail with reference to the above examples, those of ordinary skill in the art shall understand that the technical solutions recorded in the above examples may be modified, or part or all of technical features thereof may be equivalently replaced; these modifications or replacements do not enable the essence of the corresponding technical solutions to depart from the scope of the technical solutions of the examples of the present disclosure.

For simplicity and illustrative purposes, the present disclosure is described by referring mainly to examples thereof. In the above descriptions, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of particular elements, the term "includes" means including but not limited to, the term "including" means including but not limited to, and the term "based on" means based at least in part on.

The above description is merely preferred examples of the present disclosure and is not intended to limit the present disclosure in any form. Although the present disclosure is disclosed by the above examples, the examples are not intended to limit the present disclosure. Those skilled in the art, without departing from the scope of the technical scheme of the present disclosure, may make a plurality of changes and modifications of the technical scheme of the present disclosure by the method and technical content disclosed above.

Therefore, without departing from the scope of the technical scheme of the present disclosure, based on technical essences of the present disclosure, any simple alterations, equal changes and modifications should fall within the protection scope of the technical scheme of the present disclosure. Accordingly, other embodiments are within the scope of the following claims.

What is claimed is:

1. A method of denoising a Computed Tomography (CT) image, comprising:
generating an original CT image according to raw data, wherein a pixel count of the original CT image is greater than a preset target pixel count, the raw data is obtained by scanning a subject;
obtaining a denoised image by denoising the original CT image; and
obtaining a target image as a CT image of the subject by compressing the denoised image to the preset target pixel count based on an interpolation algorithms;
wherein generating the original CT image according to the raw data comprises:
modifying an image reconstruction matrix according to a first pixel count, wherein the first pixel count is greater than the preset target pixel count; and
generating the original CT image by performing image reconstruction based on the raw data and the modified image reconstruction matrix.

2. The method of claim 1, wherein denoising the original CT image comprises:
obtaining a filtering CT image by denoising the original CT image based on a filtering algorithm;
generating a fusion image by taking the filtering CT image as an input image to be fused with the original CT image;
obtaining a denoised image by denoising the fusion image based on the filtering algorithm; and
when a preset constraint condition is not met, updating the denoised image by taking the denoised image as a new input image to be fused with the original CT image until the preset constraint condition is met.

3. The method of claim 2, wherein the filtering algorithm is a non-local means filtering algorithm.

4. The method of claim 2, wherein the preset constraint condition comprises any one of the following:
a quality of the denoised image reaches a preset value, or
a number of times of updating the denoised image reaches a preset threshold.

5. The method of claim 1, wherein denoising the original CT image comprises:
obtaining the denoised image by performing a principal component analysis for the original CT image.

6. The method of claim 1, wherein the interpolation algorithm is a Lanczos interpolation algorithm.

7. A device for denoising a Computed Tomography (CT) image comprising a processor, wherein by reading and executing machine-executable instructions corresponding to a control logic for denoising a CT image and stored on a machine-readable storage medium, the processor is caused to:
generate an original CT image according to raw data, wherein a pixel count of the original CT image is greater than a preset target pixel count, the raw data is obtained by scanning a subject;
obtain a denoised image by denoising the original CT image; and
obtain a target image as a CT image of the subject by compressing the denoised image to the preset target pixel count based on an interpolation algorithms;
wherein generating the original CT image according to the raw data comprises:
modifying an image reconstruction matrix according to a first pixel count, wherein the first pixel count is greater than the preset target pixel count; and
generating the original CT image by performing image reconstruction based on the raw data and the modified image reconstruction matrix.

8. The device of claim 7, wherein when the original CT image is denoised, the machine-readable instructions further cause the processor to:
obtain a filtering CT image by denoising the original CT image based on a filtering algorithm;
generate a fusion image by taking the filtering CT image used as an input image to be fused with the original CT image;
obtain a denoised image by denoising the fusion image based on the filtering algorithm; and
when a preset constraint condition is not met, update the denoised image by taking the denoised image as a new input image to be fused with the original CT image until the preset constraint condition is met.

9. The device of claim 8, wherein the filtering algorithm is a non-local means filtering algorithm.

10. The device of claim 8, wherein the preset constraint condition comprises any one of the following:
a quality of the denoised image reaches a preset value, or
a number of times of updating the denoised image reaches a preset threshold.

11. The device of claim 7, wherein denoising the original CT image comprises:
obtaining the denoised image by performing a principal component analysis for the original CT image.

12. The device of claim 7, wherein the interpolation algorithm is a Lanczos interpolation algorithm.

13. A non-transitory computer-readable storage medium storing a computer program, wherein when executing the computer program, a processor implements the following functions:
generating an original CT image according to raw data, wherein a pixel count of the original CT image is greater than a preset target pixel count, the raw data is obtained by scanning a subject;
obtaining a denoised image by denoising the original CT image; and
obtaining a target image as a CT image of the subject by compressing the denoised image to the preset target pixel count based on an interpolation algorithm;
wherein generating the original CT image according to the raw data comprises:
modifying an image reconstruction matrix according to a first pixel count, wherein the first pixel count is greater than the preset target pixel count; and
generating the original CT image by performing image reconstruction based on the raw data and the modified image reconstruction matrix.

* * * * *